(12) United States Patent
Frey et al.

(10) Patent No.: US 7,874,571 B2
(45) Date of Patent: Jan. 25, 2011

(54) TRAILER WITH FOUR WHEEL STEERING AND INDEPENDENT SUSPENSION

(75) Inventors: Oscar Frey, Listowel (CA); Ryan Frey, Listowel (CA)

(73) Assignee: 1708828 Ontario Ltd., Listowel, Ontario ( * ) Notice: Subject to any disclaimer, the term of this patent is extended or adjusted under 35 U.S.C. 154(b) by 232 days.

(21) Appl. No.: 12/198,368

(22) Filed: Aug. 26, 2008

(65) Prior Publication Data

US 2010/0052289 A1 Mar. 4, 2010

(51) Int. Cl.
B62D 13/04 (2006.01)

(52) U.S. Cl. .................. 280/442; 280/443; 280/444; 280/445

(58) Field of Classification Search ................. 280/442, 280/443, 445, 444
See application file for complete search history.

(56) References Cited

U.S. PATENT DOCUMENTS

| | | |
|---|---|---|
| 1,160,499 A | 11/1915 | Fageol |
| 1,237,507 A | 8/1917 | Gregory |
| 2,033,298 A | 3/1936 | Pribil |
| 2,087,299 A | 7/1937 | Pribil |
| 2,271,304 A | 1/1942 | Mulholland |
| 2,325,822 A | 8/1943 | Whitmer |
| 2,376,001 A | 5/1945 | Nogle |
| 2,445,134 A | 7/1948 | Curell |
| 2,525,506 A | 10/1950 | Wiedman |
| 2,543,948 A | 3/1951 | Wiedman |
| 2,582,716 A | 1/1952 | Nelson |
| 2,643,892 A | 6/1953 | Fletcher et al. |
| 3,211,467 A | 10/1965 | Siddall |
| 3,410,571 A | 11/1968 | Bishop |
| 3,620,549 A | 11/1971 | Miller et al. |
| 3,684,108 A | 8/1972 | Olson |
| 3,806,160 A | 4/1974 | Duerksen |
| 4,168,082 A * | 9/1979 | Hendrickson ............. 280/405.1 |
| 4,352,509 A * | 10/1982 | Paton et al. .................. 280/687 |
| 4,405,147 A | 9/1983 | Horsman et al. |
| 4,524,841 A * | 6/1985 | Waggoner ................... 280/81.6 |
| 4,635,952 A | 1/1987 | Smith |
| 4,655,467 A * | 4/1987 | Kitzmiller et al. ........... 280/444 |
| 4,720,119 A | 1/1988 | Ritter |
| 4,934,726 A * | 6/1990 | Daenens et al. ............. 280/408 |
| 5,035,439 A * | 7/1991 | Petrillo ....................... 280/81.6 |
| 5,340,142 A | 8/1994 | Kuhns |
| 5,570,754 A * | 11/1996 | Stimson ....................... 180/234 |
| 5,577,760 A * | 11/1996 | Pressler ............... 280/124.167 |
| 5,873,592 A * | 2/1999 | Daenens ..................... 280/410 |
| 6,273,446 B1 * | 8/2001 | Paul ........................... 280/448 |

(Continued)

Primary Examiner—Joanne Silbermann
Assistant Examiner—Marlon A Arce
(74) Attorney, Agent, or Firm—Bereskin & Parr LLP

(57) ABSTRACT

A trailer having a frame extending along a longitudinal axis and having a front end and a rear end, a steering linkage coupled to the frame, a pair of front wheel assemblies coupled to the front end of the frame, and a pair of rear wheel assemblies coupled to the rear end of the frame. Each wheel assembly includes a wheel carrier having a pivot member pivotally coupled to the frame along a steering axis, the wheel carrier being coupled to the steering linkage so that actuation of the steering linkage pivots the wheel carrier about the steering axis, and a wheel rotatably coupled to the wheel carrier along a wheel axis. The wheel axis is oriented approximately perpendicular to the steering axis, and the wheel axis is offset from the steering axis.

15 Claims, 13 Drawing Sheets

U.S. PATENT DOCUMENTS 6,290,248 B1 * 9/2001 Yrigoyen ................. 280/476.1
6,450,524 B1 * 9/2002 Lippens et al. .............. 280/445
6,789,810 B2    9/2004 Strong
7,134,829 B2 * 11/2006 Quenzi et al. ............... 414/482
7,631,881 B2 * 12/2009 Broemeling ............. 280/5.521

* cited by examiner

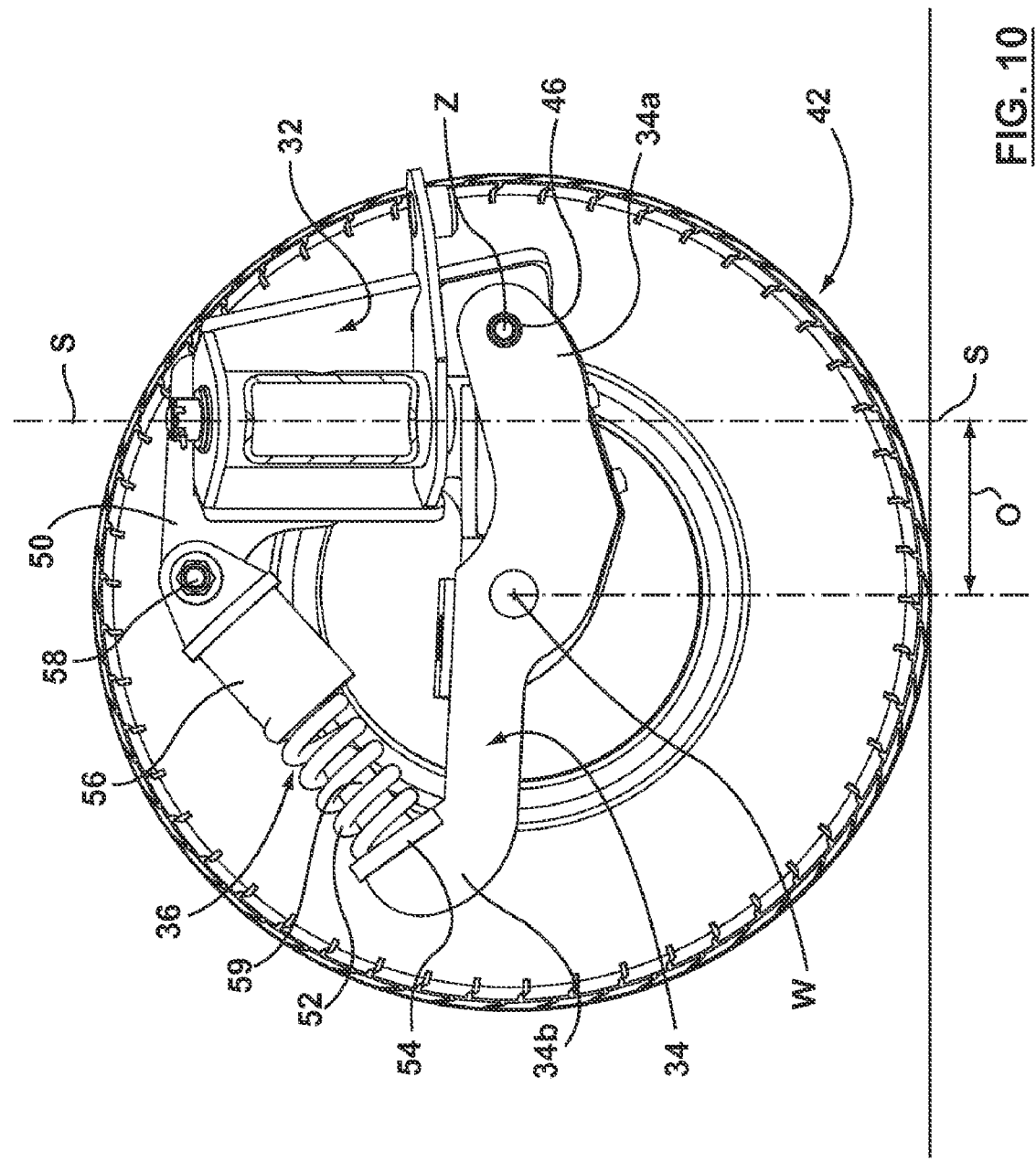

TRAILER WITH FOUR WHEEL STEERING AND INDEPENDENT SUSPENSION

TECHNICAL FIELD

The invention relates to trailers, and in particular to farm trailers with four wheel steering.

BACKGROUND

Trailers are used in many applications. One specific application is transporting farm equipment such as combine headers. In the past, combine headers have been 30 to 40 feet long, but newer combine headers now exceed 50 feet in length. To accommodate these longer combine headers, trailers need to be more maneuverable and able to carry heavier loads.

Conventional trailers are typically limited in their maneuverability. One reason for limited maneuverability is that conventional trailers generally have wheels that are spaced apart from the frame by a limited wheel clearance. Specifically, the wheel clearance is limited by the width of a standard roadway minus the width of the frame. The limited wheel clearance affects maneuverability because, as the wheels pivot to steer the trailer, the edges of the wheels tend to hit or rub against the sides of the frame. This interference tends to limit the turning radius of the trailer, which reduces maneuverability.

Limited wheel clearance also tends to restrict the maximum load capacity of the trailer, because heavier loads generally require larger tires. Unfortunately, as tires get larger the wheel clearance becomes smaller, which further reduces the maneuverability of the trailer.

Another problem with conventional trailers is that highways and other roadways tend to have bumps, potholes and other road imperfections that disturb the trailer. To reduce the impact of these road imperfections, trailers typically include suspension systems. However, conventional trailers have suspension systems generally connected between the frame and the wheels so that when the trailer encounters a road imperfection, the resulting disturbance is transmitted throughout the entire frame to each wheel. This can adversely affect the ride quality, handling, and maneuverability of the trailer, particularly at high speeds.

Accordingly, there is a need for an improved trailer and an improved wheel assembly for a trailer.

SUMMARY OF THE INVENTION

One aspect of the present invention is a trailer comprising a frame extending along a longitudinal axis, the frame having a front end and a rear end, a steering linkage coupled to the frame, a pair of front wheel assemblies coupled to the front end of the frame, and a pair of rear wheel assemblies coupled to the rear end of the frame. Each wheel assembly comprises a wheel carrier comprising a pivot member pivotally coupled to the frame along a steering axis, the wheel carrier being coupled to the steering linkage so that actuation of the steering linkage pivots the wheel carrier about the steering axis, and a wheel rotatably coupled to the wheel carrier along a wheel axis. The wheel axis is oriented approximately perpendicular to the steering axis, and the wheel axis is offset from the steering axis.

The wheel carrier of each wheel assembly may comprise a suspension arm pivotally coupled to the pivot member along a suspension axis, a shock absorber extending between the suspension arm and the pivot member, the shock absorber being configured to dampen pivotal motion of the suspension arm about the suspension axis, and a wheel spindle extending from the suspension arm so as to rotatably couple the wheel to the wheel carrier. The wheel spindle may define the wheel axis so that the wheel axis is offset from the suspension axis. The suspension axis may be parallel to the wheel axis. The wheel axis may be located between the suspension axis and the shock absorber.

The wheel carrier of each wheel assembly may comprise a wheel spindle extending from the pivot member so as to rotatably couple the wheel to the wheel carrier. The wheel spindle may define the wheel axis.

The wheel axis of each of the front wheel assemblies may be offset from the steering axis in a forward direction relative to the steering axis when the wheels are oriented along the longitudinal axis. The wheel axis of each of the rear wheel assemblies may be offset from the steering axis in a backward direction relative to the steering axis when the wheels are oriented along the longitudinal axis.

The frame may include at least one longitudinal frame member extending along the longitudinal axis, a front cross-member extending across the longitudinal frame member at the front end of the frame, and a rear cross-member extending across the longitudinal frame member at the rear of the frame. The front cross-member may have two ends extending outward from opposite sides of the longitudinal frame member and the front wheel assemblies may be coupled to the ends of the front cross-member. The rear cross-member may have two ends extending outward from opposite sides of the longitudinal frame member and the rear wheel assemblies may be coupled to the ends of the rear cross-member. The longitudinal member may have two ends at the front end and the rear end of the frame respectively, and the front cross-member and the rear cross-member may be attached to the ends of the longitudinal frame member.

The trailer may comprise a tow arm pivotally coupled to the front end of the frame, the tow arm having a coupling configured to couple the frame to a towing vehicle. The steering linkage may comprise a plurality of interconnected linkage members. The tow arm may be coupled to at least one of the linkage members, and each wheel assembly may be coupled to at least one of the linkage members so that, when the towing vehicle turns, the tow arm pivots about the frame and the linkage members pivot each wheel assembly about their respective steering axis so as to steer the trailer. The steering linkage may be configured to provide four wheel steering.

The trailer may comprise a supporting structure attached to the frame for supporting a piece of farm equipment. The supporting structure may be configured to support a combine header.

According to another aspect of the invention, there is provided a trailer comprising a frame including at least one longitudinal frame member extending along a longitudinal axis, a front cross-member extending across the longitudinal frame member at a front end of the frame, and a rear cross-member extending across the longitudinal frame member at a rear end of the frame. The front cross-member has two ends extending outward from opposite sides of the longitudinal frame member, and the rear cross-member has two ends extending outward from opposite sides of the longitudinal frame member. The trail also comprises a steering linkage coupled to the frame, a pair of front wheel assemblies coupled to the ends of the front cross-member, and a pair of rear wheel assemblies coupled to the ends of the rear cross-member. Each wheel assembly comprises a wheel carrier comprising a pivot member pivotally coupled to the frame along a steering axis, the wheel carrier being coupled to the steering linkage so that actuation of the steering linkage pivots the wheel carrier about the steering axis, and a wheel rotatably coupled to the wheel carrier along a wheel axis. The wheel axis is oriented approximately perpendicular to the steering axis, and the wheel axis is offset from the steering axis.

The longitudinal member may have two ends at the front end and the rear end of the frame respectively, and the front cross-member and the rear cross-member may be attached to the ends of the longitudinal frame member.

The wheel axis of each of the front wheel assemblies may be offset from the steering axis in a forward direction relative to the steering axis when the wheels are oriented along the longitudinal axis. The wheel axis of each of the rear wheel assemblies may be offset from the steering axis in a backward direction relative to the steering axis when the wheels are oriented along the longitudinal axis.

According to another aspect of the invention, there is provided a wheel assembly for a trailer having a frame extending along a longitudinal axis, and a steering linkage coupled to the frame. The wheel assembly comprises a wheel carrier comprising a pivot member pivotally couplable to the frame of the trailer along a steering axis, the wheel carrier being couplable to the steering linkage of the trailer so that actuation of the steering linkage pivots the wheel carrier about the steering axis, and a wheel rotatably coupled to the wheel carrier along a wheel axis. The wheel axis is oriented approximately perpendicular to the steering axis, and the wheel axis is offset from the steering axis.

Other aspects and features of the invention will become apparent, to those ordinarily skilled in the art, upon review of the following description of some exemplary embodiments.

BRIEF DESCRIPTION OF THE DRAWINGS

The invention will now be described, by way of example only, with reference to the following drawings, in which:

FIG. 10 is an elevation view of a wheel assembly according to an embodiment of the present invention;

DETAILED DESCRIPTION OF THE INVENTION

Figure 1:
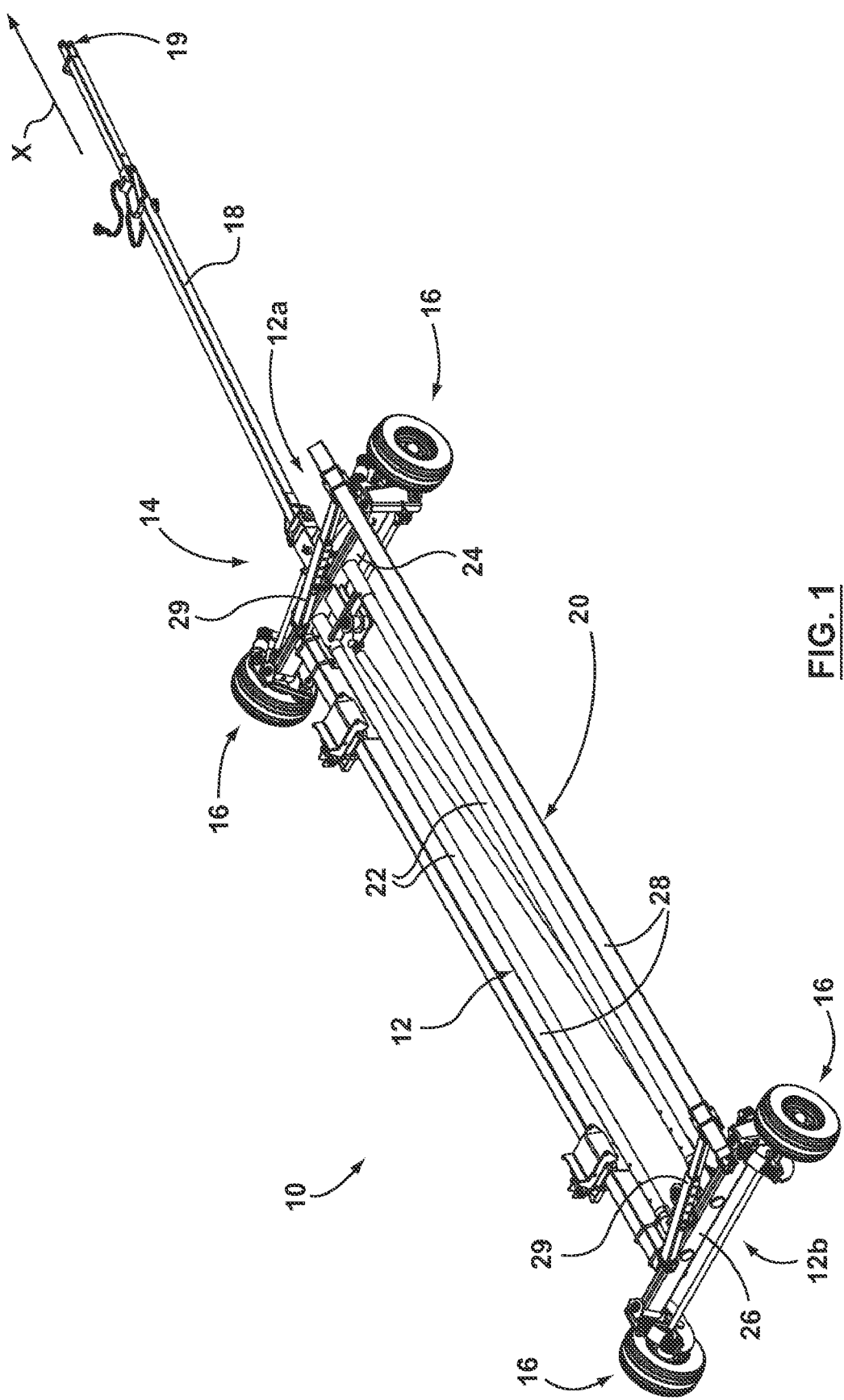
FIG. 1 is a top perspective view of a trailer, according to an embodiment of the present invention.

Referring to FIG. 1, illustrated therein is a trailer 10 according to an embodiment of the present invention. The trailer 10 includes a frame 12 having a generally rectangular construction, a steering mechanism 14 for steering the trailer 10, a plurality of wheel assemblies 16 pivotally coupled to the frame 12 and the steering mechanism 14, and a supporting structure 20.

The frame 12 includes two longitudinal frame members 22 extending along a longitudinal axis X between a front end 12a of the frame 12 and a rear end 12b of the frame 12. The frame 12 also includes a front cross-member 24 that extends transversely across the longitudinal frame members 22 at the front end 12a of the frame 12, and a rear cross-member 26 extending transversely across the longitudinal frame members 22 at the rear end 12b of the frame 12. As shown, the front cross-member 24 and rear cross-member 26 are attached to the ends of the longitudinal frame members 22.

The supporting structure 20 is configured to support a load on the trailer 10 such as a combine header or another piece of farming equipment. The supporting structure 20 includes two support beams 28 extending along the longitudinal axis X, which are coupled to the front and rear cross-members 24, 26. The support beams 28 are generally located further outward from the longitudinal axis X as compared to the longitudinal frame members 22. One of the support beams 28 is coupled directly to the cross-members 24, 26 in the same plane as the longitudinal frame members 22. The other support beam 28 is coupled to the cross-members 24, 26 using two inclined support members 29, each of which is rigidly attached to one of the cross-members 24, 26.

Generally, the wheel assemblies 16 support the frame 12 while a towing vehicle (not shown) tows the trailer 10 using a tow arm 18. In particular, one end of the tow arm 18 is pivotally coupled to the front end 12a of the frame 12, and the other end of the tow arm 18 has a coupling 19 that can be coupled to a hitch, or another suitable attachment device on the towing vehicle. The towing vehicle may be a farm tractor, a pick-up truck, or another suitable vehicle.

Figure 2:
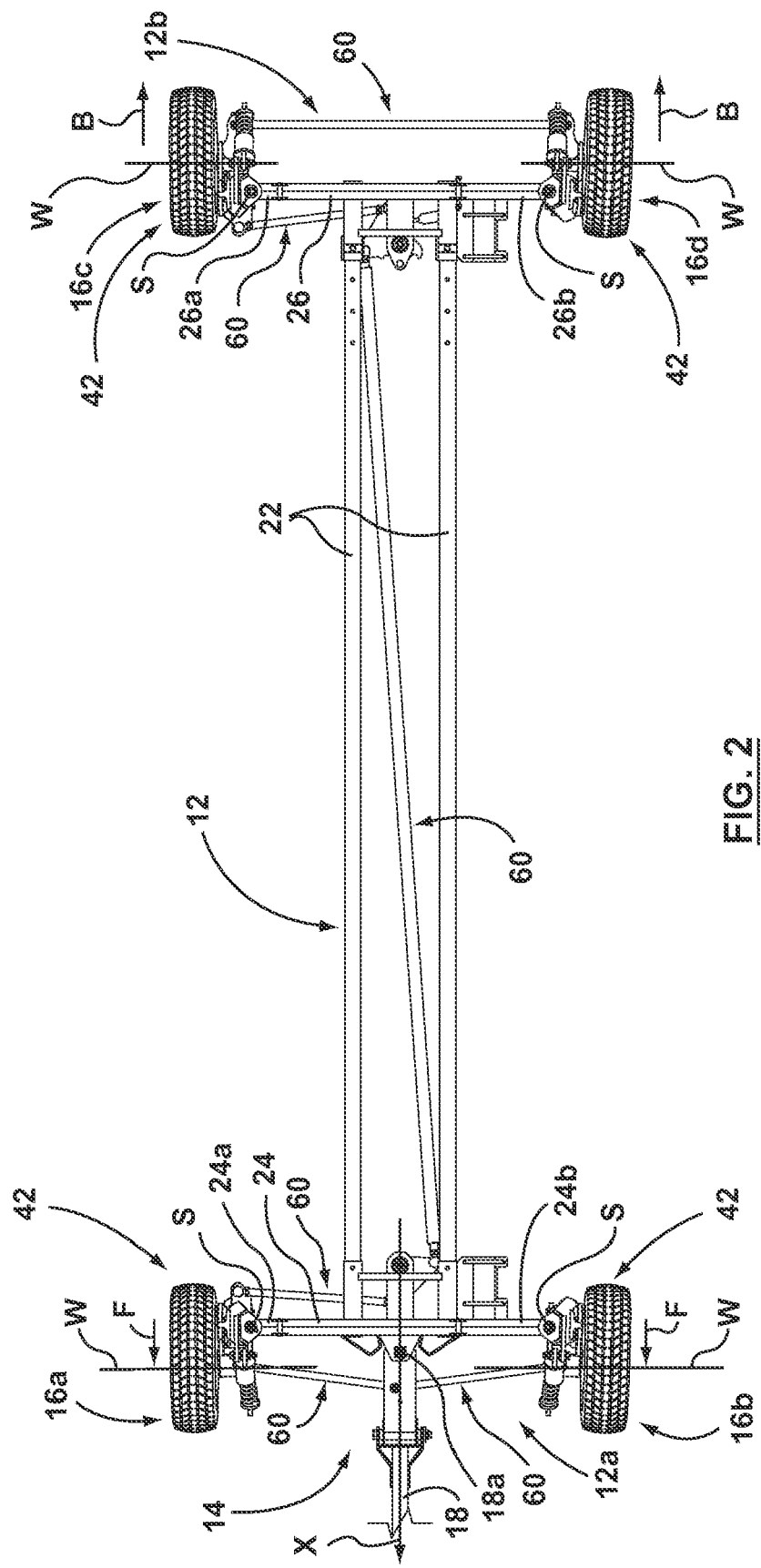
FIG. 2 is a plan view of the trailer of FIG. 1 having a supporting structure removed.

Referring now to FIG. 2, showing the trailer 10 with the supporting structure 20 removed for clarity, the trailer 10 includes a pair of front wheel assemblies 16a, 16b coupled to the front end 12a of the frame, and a pair of rear wheel assemblies 16c, 16d coupled to the rear end 12b of the frame 12. The front wheel assemblies 16a, 16b are coupled to opposite sides of the frame 12. Specifically, the front cross-member 24 has two ends 24a, 24b extending outward from opposite sides of the longitudinal frame members 22. The front-right wheel assembly 16a is coupled to one end 24a of the front cross-member 24 and the front-left wheel assembly 16b is coupled to the other end 24b of the front cross-member 24. Similarly, the rear cross-member 26 has two ends 26a, 26b, extending outward from opposite sides of the longitudinal frame members 22 and the rear wheel assemblies 16c, 16d are coupled to the ends 26a, 26b of the rear cross-member 26.

Each wheel assembly 16 is coupled to the steering mechanism 14 so that actuation of the steering mechanism 14 pivots the wheel assemblies 16 relative to the frame 12 so as to steer the trailer 10. In the illustrated embodiment, the steering mechanism 14 is a steering linkage 60 comprising a plurality of interconnected linkage members indicated generally by the reference numeral 60. Each wheel assembly 16 is coupled to at least one of the linkage members so that actuation of the steering linkage 60 moves the linkage members and pivots the wheel assemblies 16. At least one of the linkage members is also coupled to the tow arm 18 such that as the towing vehicle turns, the tow arm 18 pivots about the frame 12 at pivot 18a, and moves the linkage members so as to pivot each wheel assembly 16 and steer the trailer 10.

Figure 3:
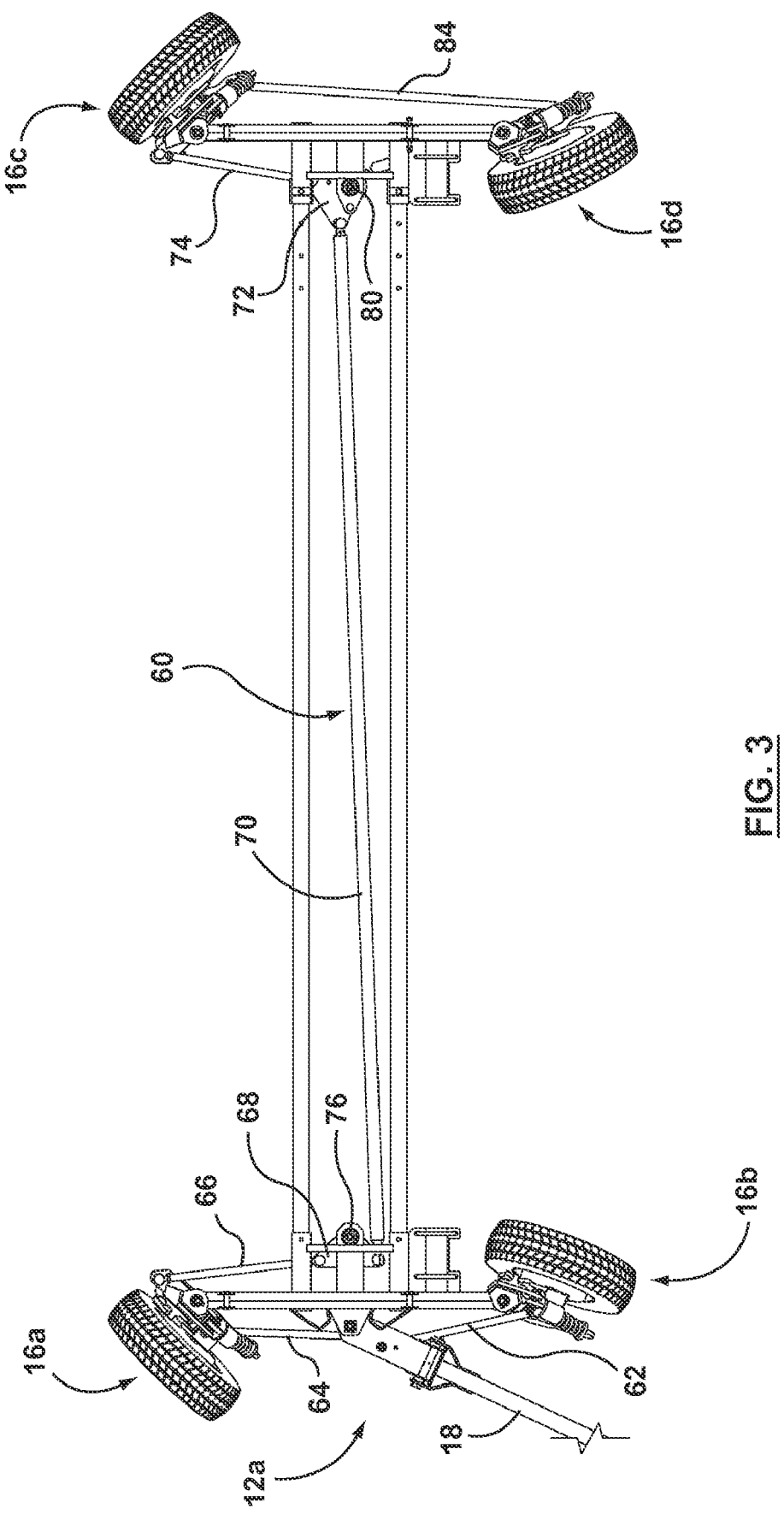
FIG. 3 is a plan view of the trailer of FIG. 2 turning counter-clockwise.

As will be described in greater detail below, the steering linkage 60 provides the trailer 10 with four wheeled steering, such that the front wheel assemblies 16a, 16b pivot about the frame 12 in one angular direction while the rear wheel assemblies 16c, 16d pivot about the frame in an opposite angular direction. For example, as shown in FIG. 3, when steering the trailer 10 counter-clockwise, the steering linkage 60 pivots the front wheel assemblies 16a, 16b counter-clockwise and pivots the rear wheel assemblies 16c, 16d clockwise. As shown, the steering linkage 60 pivots each wheel assembly 16 a different amount. In other embodiments, the steering linkage 60 may pivot the wheel assemblies 16 the same amount.

Figure 4:
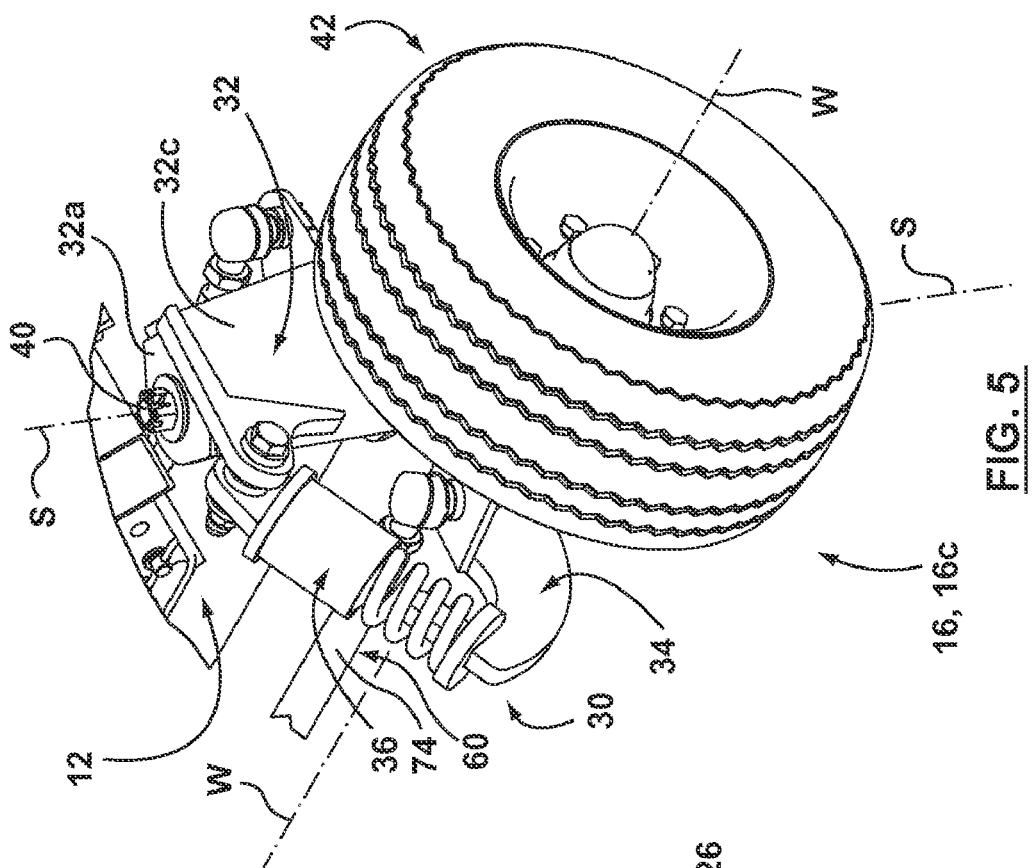
FIG. 4 is a top perspective view of a rear-left wheel assembly of the trailer shown in FIG. 1.
Figure 5:
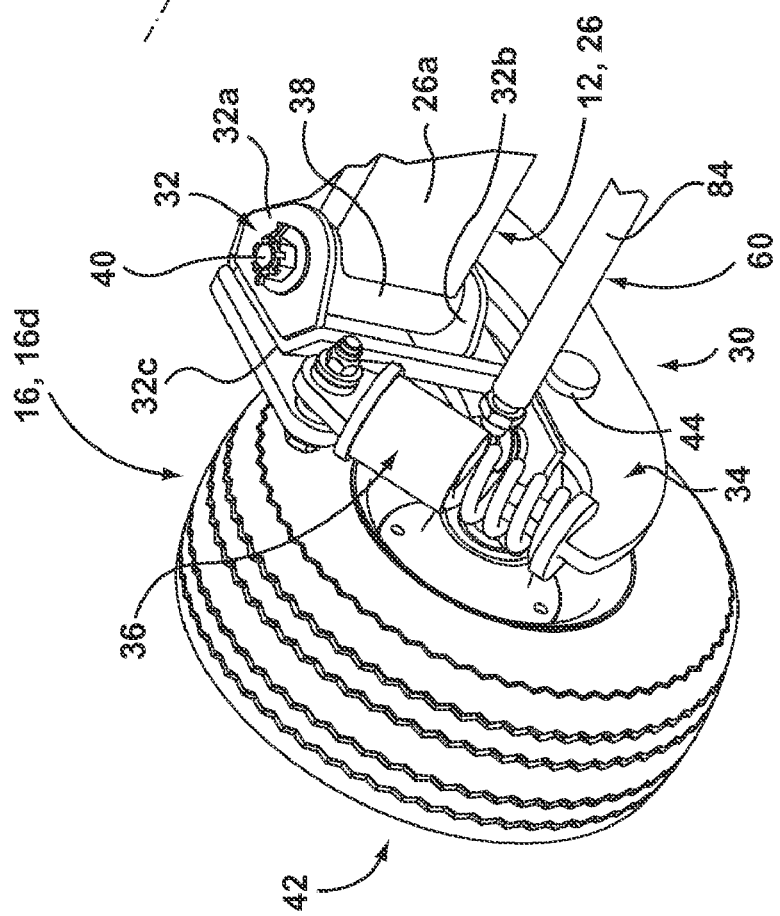
FIG. 5 is a top perspective view of a rear-right wheel assembly of the trailer shown in FIG. 1.

Referring to FIGS. 4 and 5, the wheel assemblies 16 will be described in greater detail. Each wheel assembly 16 includes a wheel carrier 30 and a wheel 42 rotatably coupled to the wheel carrier 30 along a wheel axis W. Generally, the wheel carrier 30 connects the wheel 42 to the frame 12 so that actuation of the steering linkage 60 pivots the wheel 42 in order to steer the trailer 10.

As shown best in FIG. 5, the wheel carrier 30 includes a pivot member 32 pivotally coupled to the frame 12 along a steering axis S. The wheel carrier 30 also includes a suspension arm 34 and a shock absorber 36, which will be described in detail later below, and a wheel spindle 44 that rotatably couples the wheel 42 to the wheel carrier 30 (the wheel spindle 44 is not shown in FIG. 5). Generally, the wheel spindle 44 defines the wheel axis W. The wheel spindle 44 is shown best in FIGS. 11 and 12 where the wheel spindle 44 extends through the suspension arm 34 to the hub of the wheel 42 so as to rotatably couple the wheel 42 to the wheel carrier 30. In other embodiments, the wheel spindle 44 may be located on other parts of the wheel carrier 30. For example, the wheel spindle 30 may extend outward from the pivot member 32 so as to rotatably couple the wheel 42 to the wheel carrier 30.

In the illustrated embodiment, the pivot member 32 has an upper yoke plate 32a and a lower yoke plate 32b spaced apart by a vertical spacer plate 32c so that the yoke plates 32a, 32b straddle the frame 12. Specifically, with reference to the rear-left wheel assembly 16d shown in FIG. 4, the yoke plates 32a, 32b straddle a vertically oriented tubular member 38 located at the end 26a of the rear cross-member 26. Each of the yoke plates 32a, 32b also has a borehole aligned with the tubular member 38 so as to receive a kingpin 40 through the boreholes and the tubular member 38. The kingpin 40 pivotally couples the wheel carrier 30 to the frame 12 such that the central axis of the kingpin 40 defines the steering axis S.

The wheel carrier 30 is coupled to the steering linkage 60 so that actuation of the steering linkage 60 pivots the wheel carrier 30 about the steering axis S. For example, as shown in FIG. 4 the steering linkage 60 includes a tie rod 84 coupled to the suspension arm 34 at a point offset from the steering axis S so that actuation of the steering linkage 60 moves the tie rod 84, which pivots the wheel assembly 20 about the steering axis S. In some embodiments, the steering linkage 60 may be pivotally coupled to another portion of the wheel carrier 30.

Figure 11:
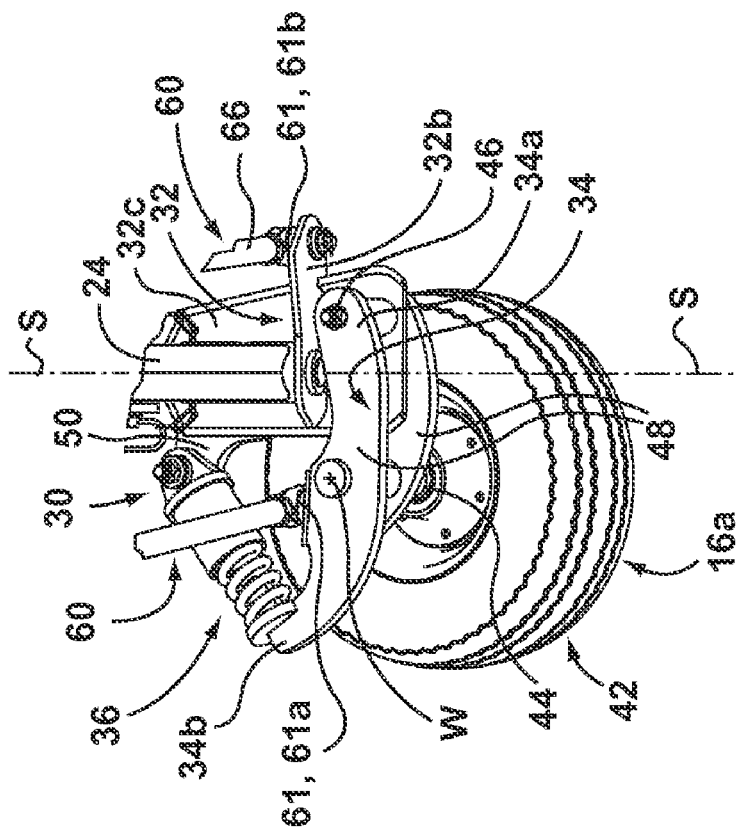
FIG. 11 is a bottom perspective view of a front-right wheel assembly of the trailer shown in FIG. 1.

For example, as shown in FIG. 11, the steering linkage 60 includes a tie rod 66 coupled to the lower yoke plate 32b of the pivot member 32.

Figure 6:
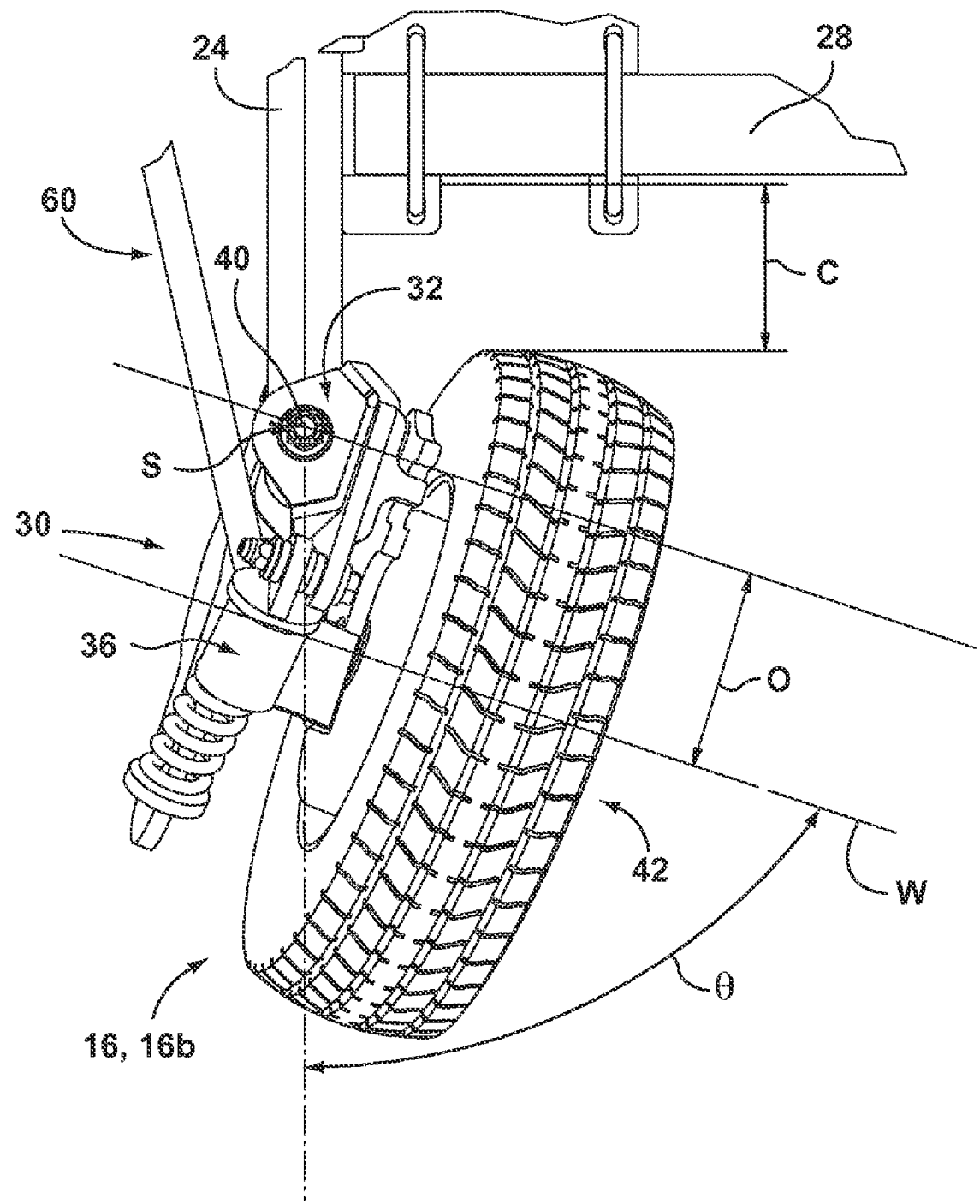
FIG. 6 is a plan view of a front-left wheel assembly of the trailer as shown in FIG. 3.

Referring to FIGS. 5 and 6, the wheel axis W is oriented approximately perpendicular to the steering axis S (in FIG. 6 the steering axis S generally extends out from the page). This configuration allows the steering linkage 60 to pivot the wheel assembly 16 about the steering axis S so as to steer the trailer 10 by changing the direction that the wheel 42 rolls in.

In some embodiments, the wheel axis W and steering axis S may be inclined relative to each other while still remaining approximately perpendicular. Inclining the steering axis S relative to the wheel axis W tends to provide the trailer 10 with trailing stability. For example, with an inclined steering axis S, as the wheel assemblies 16 pivot about the steering axis S the wheels 42 raise the frame 12 relative to the ground. Gravity tends to resist this motion and urges the wheels 42 back to a straight orientation where the frame 12 is lower to the ground. Inclining the steering axis S also tends to reduce sway based on the same principle. Inclining the steering axis S or wheel axis W may also adjust the stability or performance of the trailer 10, for example by changing the camber, caster and/or other wheel parameters as known to a person of skill in the art.

As shown in FIG. 6, the wheel axis W is offset from the steering axis S by an offset distance O. The offset distance O generally allows the steering linkage 60 to pivot the wheel assemblies 16 through a wider range of angles as compared to wheel assemblies having a steering axis S that intersects the wheel axis W (i.e. a wheel assembly with no offset distance O). For example, as shown, the wheel assembly 16 has been pivoted a pivot angle θ about the steering axis S. After pivoting the wheel assembly 16, there is a clearance C between the wheel 42 and one of the support beams 28. If the wheel assembly 16 had no offset distance O the wheel 42 would be positioned closer to the support beam 28 and would not be able to pivot as far.

Figure 7:
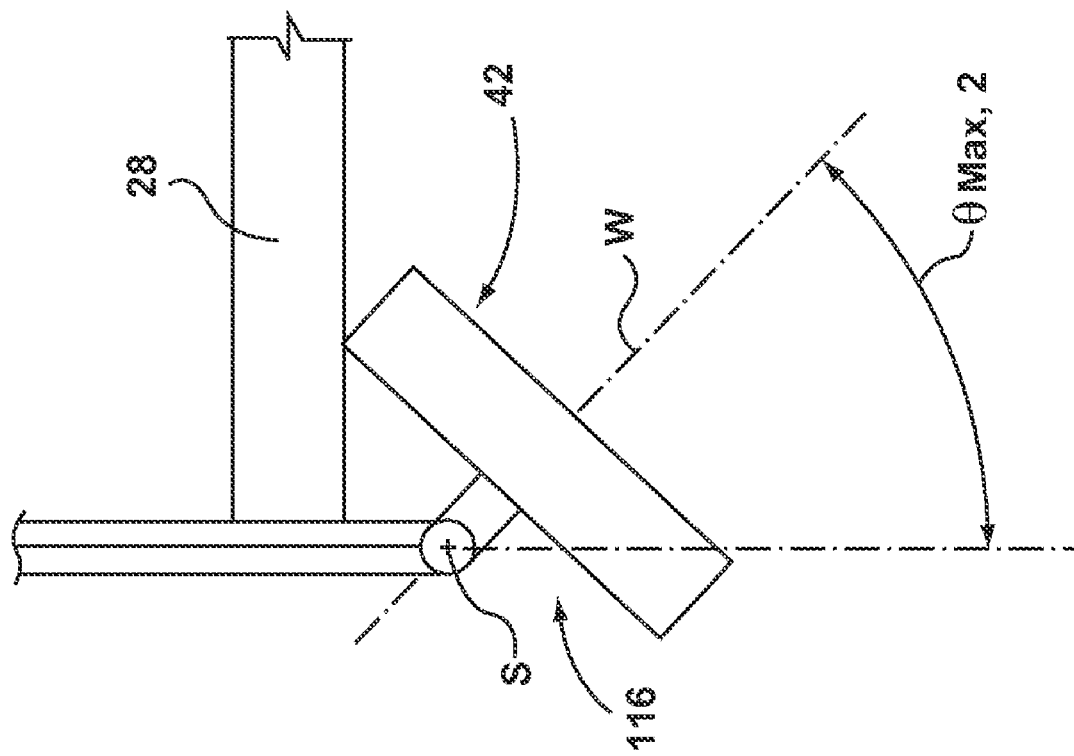
FIG. 7 is a schematic representation of a wheel assembly having a wheel axis offset from a steering axis, where the wheel assembly is pivoted counter-clockwise through a maximum pivot angle.
Figure 8:
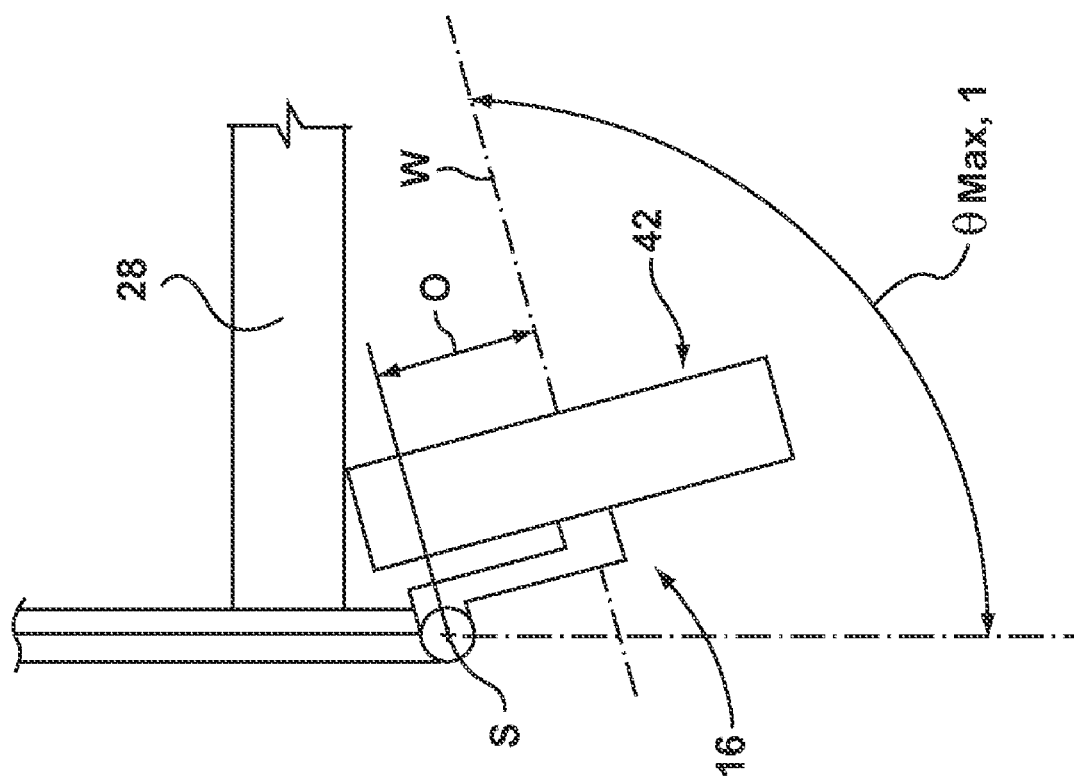
FIG. 8 is a schematic representation of a wheel assembly having a wheel axis that intersects a steering axis, where the wheel assembly is pivoted counter-clockwise through a maximum pivot angle.

FIGS. 7 and 8 are schematic diagrams showing how the offset distance O allows the wheel 42 to pivot through a larger maximum pivot angle $\theta_{Max}$ before hitting the support beam 28. In FIG. 7, the wheel assembly 16 has an offset distance O between the wheel axis W and the steering axis S. As shown, the wheel 42 can pivot through a maximum pivot angle $\theta_{Max,1}$ before hitting the support beam 28. In FIG. 8, the wheel assembly 116 has no offset between the wheel axis W and the steering axis S and the wheel 42 can pivot through a maximum pivot angle $\theta_{Max,2}$ which is smaller than the maximum pivot angle $\theta_{Max,1}$ of the wheel assembly 16 shown in FIG. 7. Specifically, the maximum pivot angle $\theta_{Max,1}$ of the wheel assembly 16 with an offset is approximately 105 degrees, whereas the maximum pivot angle $\theta_{Max,2}$ of the wheel assembly 116 with no offset is approximately 45 degrees. In some embodiments, the sides of the frame 12 or another portion of the trailer 10 may limit the maximum pivot angle $\theta_{Max}$ of the wheel 42, instead of the support beams 28.

In some embodiments, the offset distance O may permit the use of larger wheels 42 on the trailer 10. Typically, larger wheels 42 reduce the clearance between the wheel 42 and the support beams 28, which correspondingly reduces the maximum pivot angle $\theta_{Max}$ that the wheel assembly 16 can pivot before the wheel 42 hits or rubs against the support beam 28. To compensate for the reduced maximum pivot angle $\theta_{Max}$ the wheel assemblies 16 may have a larger offset distance O. In some embodiments, the offset distance O may be selected to allow both a larger maximum pivot angle $\theta_{Max}$ and a larger wheel 42.

Referring again to FIG. 2, one difference between the front wheel assemblies 16a, 16b and the rear wheel assemblies 16c, 16d is that the front wheel assemblies 16a, 16b have a wheel axis W offset in a forward direction relative to the steering axis S when the wheels 42 are oriented along the longitudinal axis X, the forward direction being indicated by the arrows F pointing away from the front end 12a of the frame 12. Conversely, the rear wheel assemblies 16c, 16d have a wheel axis W offset in a backward direction relative to the steering axis S when the wheels 42 are oriented along the longitudinal axis X, the backward direction being indicated by the arrows B pointing away from the rear end 12b of the frame 12. Configuring the wheel assemblies 16a, 16b, 16c, 16d with offsets in this fashion generally increases the maneuverability of the trailer 10 as will be appreciated from the following example.

Figure 9:
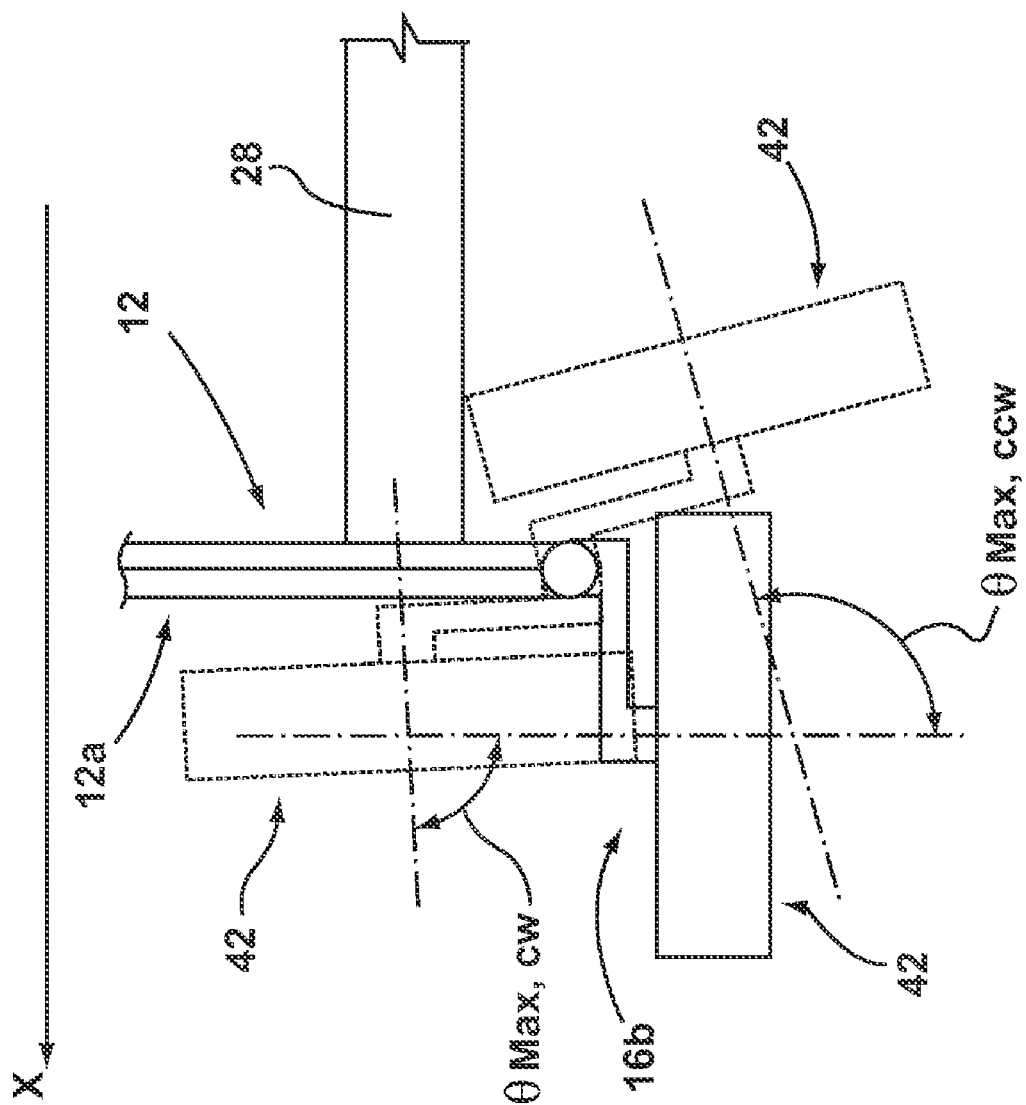
FIG. 9 is a schematic representation of a front-left wheel assembly according to an embodiment of the present invention, where the wheels are pivoted to three different angular positions.

Generally, the offset distance O tends to increase the maximum pivot angle $\theta_{Max}$ when pivoting the wheel assembly 16 about the steering axis S in one direction, but not the other direction. For example, referring to schematic diagram shown in FIG. 9, when pivoting the front-left wheel assembly 16b in the counter-clockwise direction, the offset distance O allows the wheel assembly 16b to pivot to a larger maximum pivot angle $\theta_{Max,CCW}$ before hitting or rubbing against the support beam 28. However, when pivoting the wheel assembly 16b in the clockwise direction, the wheel 42 would actually hit the support beam 28 sooner than a wheel assembly with no offset if the support beam 28 extended well in front of the wheel assembly 16b along the longitudinal direction X (but this is not the case).

To increase the maximum pivot angle $\theta_{Max}$ in both angular directions, the front wheel assemblies 16a, 16b are configured so that the wheel axis W is offset in the forward direction F ahead of the front end 12a of the frame 12. Thus, when pivoting the front-left wheel assembly 16b in the clockwise direction, the wheel 42 pivots around the front end 12a of the frame 12 instead of hitting or rubbing against the sides of the support member 28. Since the wheel axis W is offset from the steering axis S in the forward direction, the front-left wheel assembly 16b can pivot clockwise through a larger maximum pivot angle $\theta_{Max,CW}$ before hitting the front end 12a of the frame 12. Offsetting the wheel axis W of the rear wheel assemblies 16c, 16d in the backward direction behind the rear end 12b of the frame 12 provides similar benefits.

Referring again to FIG. 2, using the front cross-member 24 and the rear cross-member 26 to couple the wheel assemblies 16 to the frame 12 also tends to increase the clearance between the wheels 42 and the support beams 28. The extra clearance allows the wheel assemblies 16 to pivot through larger maximum pivot angles $\theta_{Max}$ as described above. In some embodiments, the extra clearance may allow the use of larger tires, and/or larger maximum pivot angles $\theta_{Max}$.

Figure 12:
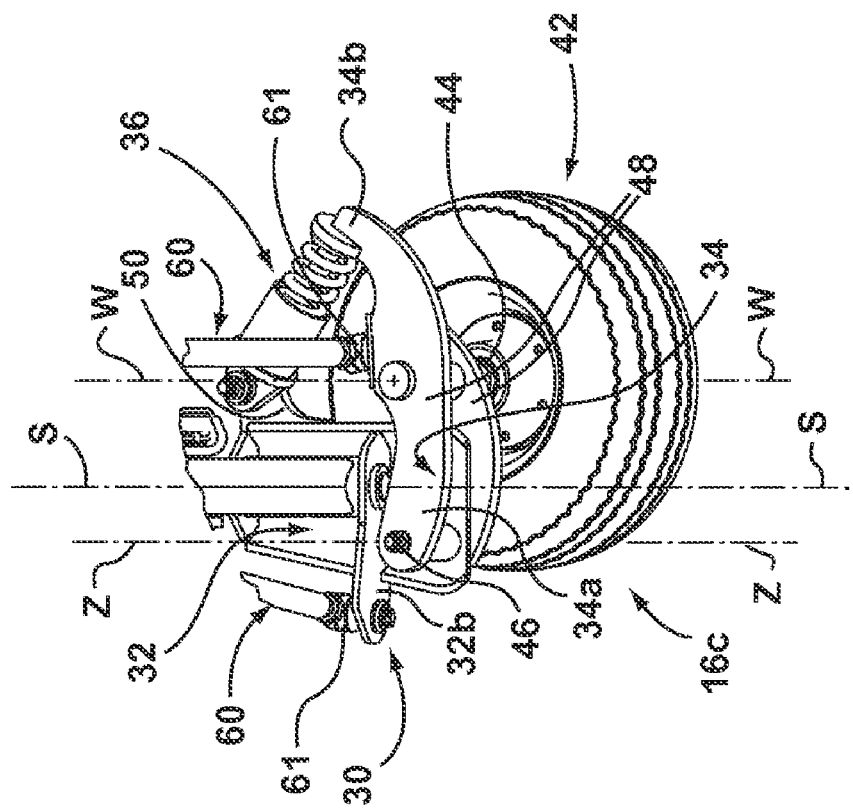
FIG. 12 is a bottom perspective view of a rear-right wheel assembly of the trailer shown in FIG. 1.

Referring to FIGS. 10-12, the configuration and operation of the suspension arm 34 and the shock absorber 36 will be described in further detail.

The suspension arm 34 has a proximal end 34a pivotally coupled to the pivot member 32 at a first pivot 46, and a distal end 34b coupled to the shock absorber 36. As shown in FIG. 11, the suspension arm 34 is constructed from two plates 48 that are pivotally coupled to the pivot member 32 at the first pivot 46, which is located on the vertical spacer plate 32c just below the lower yoke plate 32b. The first pivot 46 includes a sleeve that spaces the two plates 48 apart, and a bolt that extends through the two plates 48 and the sleeve. Generally, the suspension arm 34 pivots about the first pivot 46, which defines a suspension axis Z as shown in FIG. 12.

The wheel spindle 44 extends through the two plates 48 so as to rotatably couple the wheel 42 to the wheel carrier 30. Specifically, the wheel spindle 44 is located on the suspension arm 34 approximately midway between the suspension axis Z and the shock absorber 36. Accordingly, the wheel axis W is offset from the suspension axis Z. Furthermore, the wheel axis W is approximately parallel to the suspension axis Z. Thus, as the wheel 42 moves up and down, the suspension arm 34 pivots about the suspension axis Z.

As shown in FIG. 10, the shock absorber 36 extends between the distal end 34b of the suspension arm 34 and a plate 50 rigidly attached to the top end of the pivot member 32. Specifically, the shock absorber 36 includes a coil spring 52 that engages a circular butt plate 54 on the distal end 34b of the suspension arm 34, and a dashpot 56 pivotally coupled to the pivot member 32 at a second pivot 58 on the plate 50. Generally, the coil spring 52 is compressed between the circular butt plate 54 and the dashpot 56. The coil spring 52 also encircles a protrusion 59 extending outward from the circular butt plate 54, which tends to center the coil spring 44 on the circular butt plate 54.

Generally, the shock absorber 36 dampens pivotal movements of the suspension arm 34 about the suspension axis Z. For example, when the suspension arm 34 pivots about the suspension axis Z, the shock absorber 36 expands or contracts under resistance from the coil spring 52 and dashpot 56 so as to dampen the pivotal movements of the suspension arm 34. While expanding or contracting the shock absorber 36 may also pivot about the second pivot point 58, which tends to prevent the coil spring 52 or the dashpot 56 from jamming.

The dampening provided by the shock absorber 36 tends to absorb disturbances encountered by the wheel 42. For example, the shock absorber 36 may dampen disturbances caused by road imperfections such as bumps or potholes.

In some embodiments, the shock absorber 36 may be positioned at other locations on the suspension arm 34. For example, the shock absorber 36 may extend from the suspension arm 34 on either side of the suspension axis Z. Furthermore, the shock absorber 36 may be positioned between the wheel axis W and the suspension axis Z.

The shock absorber 36 may also have different configurations. For example, the shock absorber 36 may include a rubber block extending between the suspension arm 34 and the pivot member 34. The rubber block may be located at a point between the wheel axis W and the suspension axis Z, or the rubber block may be located at another position along the suspension arm 34.

Each wheel assembly 16 has at least one mounting plate 61 where the steering linkage 60 is coupled to the wheel carrier 30. Generally, the mounting plate 61 is offset from the steering axis S. For example, as shown in FIG. 11, the front-right wheel assembly 16a has two mounting plates 61a, 61b. One mounting plate 61a is located on the suspension arm 34 approximately midway between the steering axis S and the shock absorber 36. The other mounting plate 61b is located on the lower yoke plate 32b of the pivot member 32. In some embodiments the steering linkage 60 may be coupled to another suitable portion of the suspension arm 34 or the wheel carrier 30.

Figure 13:
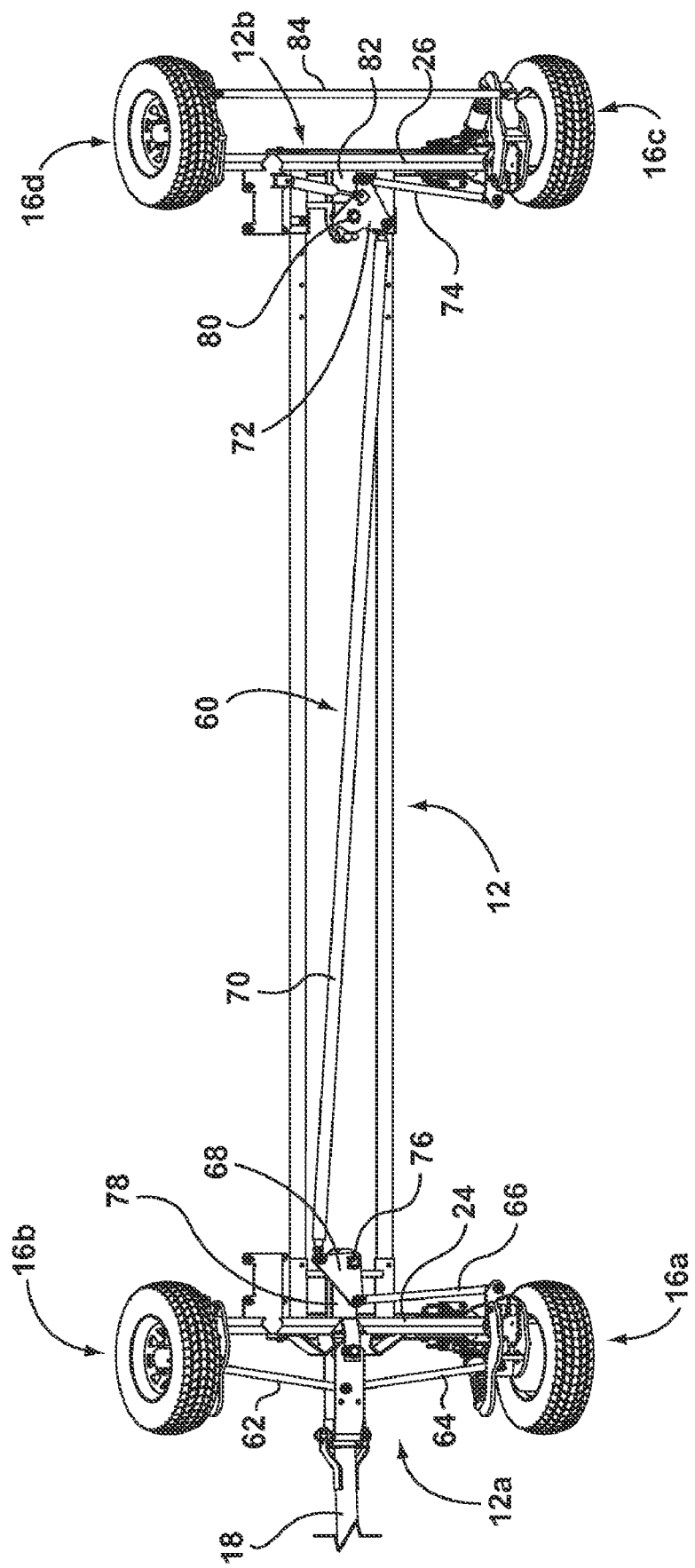
FIG. 13 is a bottom perspective view of the trailer shown in FIG. 2.

Referring now to FIG. 13, the steering linkage 60 will be described in further detail.

As indicated previously, the steering linkage 60 of the illustrated embodiment is configured to provide the trailer 10 with four wheel steering such that the front wheel assemblies 16a, 16b pivot in one angular direction while the rear wheel assemblies 16c, 16d pivot in the opposite angular direction.

To help guide the trailer 10 in the same direction as the towing vehicle, the steering linkage 60 is connected to the tow arm 18. In the illustrated embodiment, the steering linkage 60 includes two front tie rods 62, 64 coupled to the tow arm 18. Each of the front tie rods 62, 64 extend outward from opposite sides of the tow arm 18 toward each of the front wheel assemblies 16a, 16b. Specifically, the front-left tie rod 62 is coupled to the front-left wheel assembly 16b and the front-right tie rod 64 is coupled to the front-right wheel assembly 16a. Thus, when the towing vehicle turns, the tow arm 18 pivots about the frame 12, causing the front tie rods 62, 64 to move and pivot the front wheel assemblies 16a, 16b so as to steer the trailer 10.

As illustrated, the steering linkage 60 includes two linkage members coupled to the front-right wheel assembly 16a, the front right tie rod 64 (the input tie rod) and a front output tie rod 66. The front output tie rod 66 transmits the pivotal movements of the tow arm 18 to the rear wheel assemblies 16c, 16d through a front bell crank 68, an intermediate tie rod 70, a rear bell crank 72 and a rear input tie rod 74, all of which are linkage members that are part of the steering linkage 60. Specifically, the front output tie rod 66 is pivotally coupled to the front bell crank 68, which is pivotally coupled to the frame 12 at a front pivot 76 via a plate 78 that is rigidly attached to the front cross-member 24. The front bell crank 68 is also pivotally coupled to the intermediate tie rod 70, which extends from the front end 12a to the rear end 12b of the frame 12. At the rear end 12b of the frame 12, the intermediate tie rod 70 is pivotally coupled to the rear bell crank 72, which is pivotally coupled to the frame 12 at a rear pivot 80 via a plate 82 rigidly attached to the rear cross-member 26. The rear bell crank 72 is also pivotally coupled the rear input tie rod 74, which is pivotally coupled to the rear-right wheel assembly 16c.

Similar to the front-right wheel assembly 16a, the steering linkage 60 includes two linkage members coupled to the rear-right wheel assembly 16c, the rear input tie rod 74 and a rear output tie rod 84 that extends between the two rear wheel assemblies 16c, 16d. The rear output tie rod 84 is also coupled to the rear-left wheel assembly 16d such that the rear output tie rod 84 transmits pivotal movements of the tow arm 18 from the rear-right wheel assembly 16c to the rear-left wheel assembly 16d.

The configuration described above allows each wheel assembly 16a, 16b, 16c, 16d to pivot about its respective steering axis S in response to pivotal movements of the tow arm 18. Specifically, the configuration provides four wheeled steering as illustrated by the following example.

If the towing vehicle turns left as shown in FIG. 3, the tow arm 18 pushes the front-left tie rod tie rod 62 so as to pivot the front-left wheel assembly 16b counter-clockwise. The tow arm 18 also pulls the front-right tie rod 64 so as to pivot the front-right wheel assembly 16a counter-clockwise. The pivotal movement of the front-right wheel assembly 16a pulls outward on the front output tie rod 66 so as to pivot the front bell crank 68 clockwise about the front pivot 76. This pulls the intermediate tie rod 70 towards the front end 12a of the frame 12, which pivots the rear bell crank 72 counter-clockwise about the rear pivot 80. The rear bell crank 72 pushes the rear input tie rod 74 outward so as to pivot the rear-right wheel assembly 16c clockwise. The pivotal movement of the rear-right wheel assembly 16c pushes the rear output tie rod 84 toward the rear-left wheel assembly 16d so as to pivot the rear-left wheel assembly 16d clockwise. Accordingly, the steering linkage 60 provides the trailer 10 with four wheeled steering.

While the steering linkage 60 of the illustrated embodiment provides the trailer 10 with four wheel steering, in other embodiments the steering linkage 60 may provide the trailer 10 with other types of steering, such as crab steering, front wheel steering, rear wheel steering, or another type of steering. In these embodiments, the network of linkage members may have different configurations. Furthermore, the network of linkage members may have different configurations while still providing the trailer 10 with four wheeled steering.

While the steering mechanism 14 of the illustrated embodiment comprises a steering linkage 60, some embodiments may utilize other types of steering mechanisms, such as rack and pinion steering, drive-by-wire steering, or another suitable steering mechanism.

While the present embodiment describes four wheel assemblies 16, in some embodiments, the trailer 10 may have a different number of wheel assemblies 16. For example the trailer 10 may have two wheel assemblies 16, which may be coupled to the frame 12 at the front end 12a, the rear end 12b, or another position along the frame 12. Generally, the wheel assemblies 16 are arranged in pairs on opposite sides of the frame 12.

Figure 14:
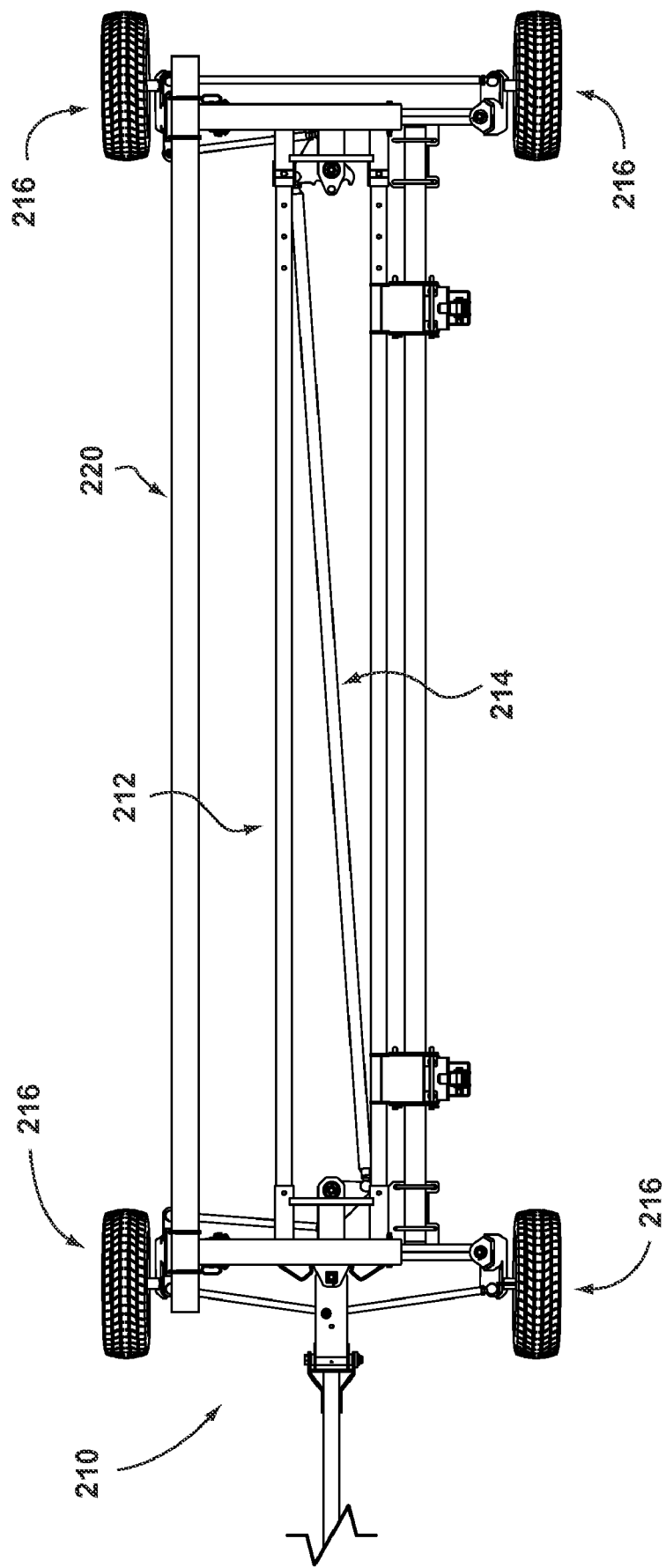
FIG. 14 is a plan view of a trailer, according to an embodiment of the present invention.
Figure 15:
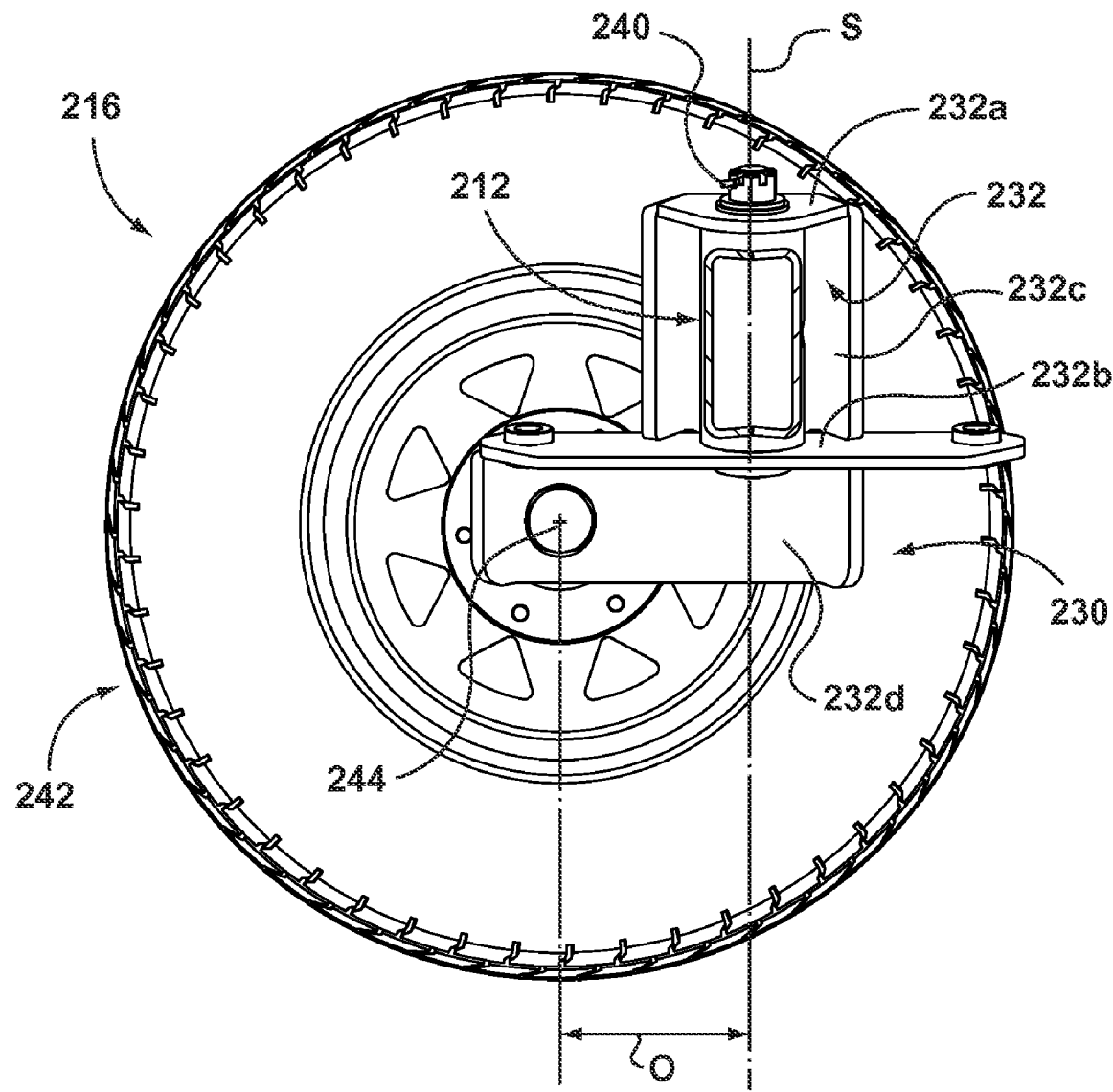
FIG. 15 is a elevation view of a wheel assembly of the trailer shown in FIG. 14.
Figure 16:
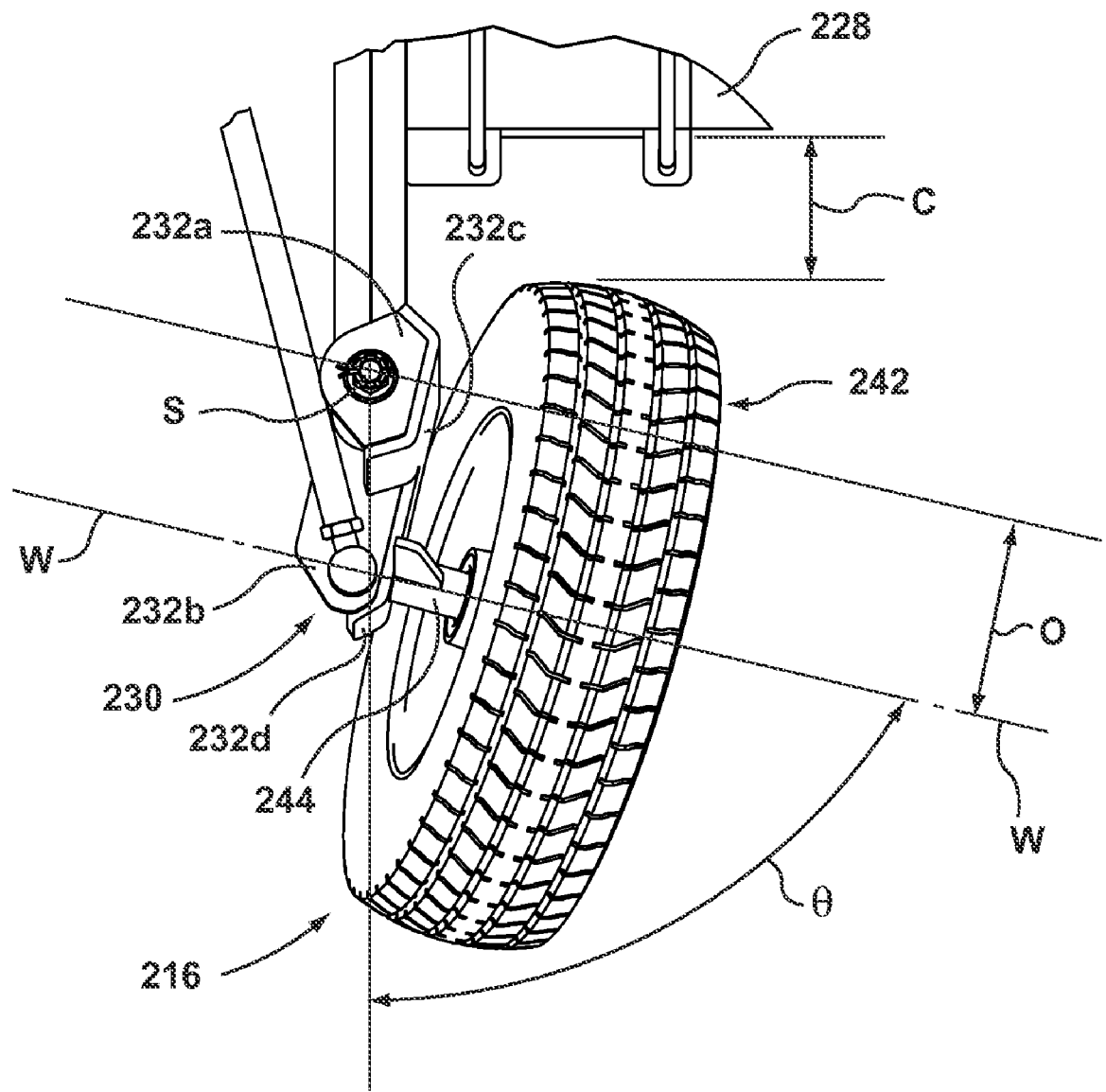
FIG. 16 is a plan view of a wheel assembly of the trailer shown in FIG. 14, where the wheel assembly has been pivoted counter-clockwise.

FIGS. 14-16 illustrate a trailer 210 according to another embodiment of the invention. Trailer 210 is generally similar to trailer 10 and corresponding elements are given similar reference numerals. Trailer 210 includes a frame 212, a steering mechanism 214, four wheel assemblies 216 coupled to the frame 212 and the steering mechanism 214, and a supporting structure 220. One difference is that the wheel assemblies 216 of trailer 210 do not include a suspension arm or a shock absorber as with trailer 10.

Referring to FIGS. 15 and 16, each wheel assembly 216 includes a wheel carrier 230 and a wheel 242 rotatably coupled to the wheel carrier 230. The wheel carrier 230 includes a pivot member 232 coupled to the frame 212 along a steering axis S. The pivot member 232 has an upper yoke plate 232a and a lower yoke plate 232b spaced apart by a vertical spacer plate 232c so that the yoke plates 232a, 232b straddle the frame 212. A kingpin 240 extends through the yoke plates 232a, 232b and the frame 212 so as to pivotally couple the wheel carrier 230 to the frame 212 along the steering axis S.

As shown best in FIG. 16, the wheel carrier 230 also includes a wheel spindle 244 extending outward from the pivot member 230. Specifically, the spindle 244 extends outward from a lower portion 232d of the vertical spacer plate 232c, which is located below the lower yoke plate 232b. The wheel spindle 244 rotatably couples the wheel 242 to the wheel carrier 230 along a wheel axis W, such that the wheel axis W is approximately perpendicular to the steering axis S. The wheel axis W is also offset from the steering axis S by an offset distance O.

FIG. 16 illustrates the wheel assembly 216 of the trailer 210 after being pivoted counter-clockwise a pivot angle θ about the steering axis S. As shown, there is a clearance C between the wheel 242 and the support beam 228 of the supporting structure 220. If the wheel assembly 216 had no offset distance O the wheel 242 would be positioned closer to the support beam 228 and would not be able to pivot as far. Accordingly, the offset distance O allows the wheel assembly 216 to pivot to a larger maximum pivot angle as described previously.

What has been described is merely illustrative of the application of the principles of the embodiments. Other arrangements and methods can be implemented by those skilled in the art without departing from the spirit and scope of the embodiments described herein.

We claim:

1. A trailer comprising:
  (a) a frame extending along a longitudinal axis, the frame having two sides, a front end and a rear end;

(b) a steering linkage coupled to the frame;
(c) a pair of front wheel assemblies coupled to the front end of the frame and a pair of rear wheel assemblies coupled to the rear end of the frame, wherein each of the wheel assemblies is spaced laterally outwardly from one of the sides of the frame, and each of the wheel assemblies comprises:
  (i) a wheel carrier comprising a pivot member pivotally coupled to the frame along a steering axis, the wheel carrier being coupled to the steering linkage so that actuation of the steering linkage pivots the wheel carrier about the steering axis; and
  (ii) a wheel rotatably coupled to the wheel carrier along a wheel axis, the wheel axis being oriented approximately perpendicular to the steering axis, wherein the wheel axis is offset from the steering axis;
(d) wherein the steering coupled to each of the wheel assemblies such that when the wheels are oriented along the longitudinal axis, the wheel axis of each of the front wheel assemblies is offset from the steering axis in a forward direction relative to the steering axis, and the wheel as of each of the rear wheel assemblies is offset from the steering axis in a backward direction relative to the steering axis.

2. The trailer of claim 1, wherein the wheel carrier of each wheel assembly comprises:
(a) a suspension arm pivotally coupled to the pivot member along a suspension axis;
(b) a shock absorber extending between the suspension arm and the pivot member, the shock absorber being configured to dampen pivotal motion of the suspension arm about the suspension axis; and
(c) a wheel spindle extending from the suspension arm so as to rotatably couple the wheel to the wheel carrier, the wheel spindle defining the wheel axis so that the wheel axis is offset from the suspension axis.

3. The trailer of claim 2, wherein the suspension axis is parallel to the wheel axis.

4. The trailer of claim 2, wherein wheel axis is located between the suspension axis and the shock absorber.

5. The trailer of claim 1, wherein the wheel carrier of each wheel assembly comprises a wheel spindle extending from the pivot member so as to rotatably couple the wheel to the wheel carrier, wherein the wheel spindle defines the wheel axis.

6. The trailer of claim 1, wherein the frame include at least one longitudinal frame member extending along the longitudinal axis, a front cross-member extending across the longitudinal frame member at the front end of the frame, and a rear cross-member extending across the longitudinal frame member at the rear of the frame, wherein the front cross-member has two ends extending outward from opposite sides of the longitudinal frame member and the front wheel assemblies are directly coupled to the ends of the front cross-member, and wherein the rear cross-member has two ends extending outward from opposite sides of the longitudinal frame member and the rear wheel assemblies are directly coupled to the ends of the rear cross-member.

7. The trailer of claim 6, wherein the longitudinal member has two ends at the front end and the rear end of the frame respectively, and the front cross-member and the rear cross-member are attached to the ends of the longitudinal frame member.

8. The trailer of claim 1, further comprising a tow arm pivotally coupled to the front end of the frame, the tow arm having a coupling configured to couple the frame to a towing vehicle, and wherein the steering linkage comprises a plurality of interconnected linkage members, the tow arm being coupled to at least one of the linkage members, and wherein each wheel assembly is coupled to at least one of the linkage members so that, when the towing vehicle turns, the tow arm pivots about the frame and the linkage members pivot each wheel assembly about their respective steering axis so as to steer the trailer.

9. The trailer of claim 8, wherein the steering linkage is configured to provide four wheel steering.

10. The trailer of claim 1, further comprising a supporting structure attached to the frame for supporting a piece of farm equipment.

11. The trailer of claim 10, wherein the supporting structure is configured to support a combine header.

12. A trailer comprising:
(a) a frame including at least one longitudinal frame member extending along a longitudinal axis, a front cross-member extending across the longitudinal frame member at a front end of the frame, and a rear cross-member extending across the longitudinal frame member at a rear end of the frame, wherein the front cross-member has two ends extending outward from opposite sides of the longitudinal frame member, and wherein the rear cross-member has two ends extending outward from opposite sides of the longitudinal frame member;
(b) a steering linkage coupled to the frame;
(c) a pair of front wheel assemblies coupled directly to the ends of the front cross-member, and a pair of rear wheel assemblies coupled directly to the ends of the rear cross-member, each wheel assembly comprising:
  (i) a wheel carrier comprising a pivot member pivotally coupled to the frame along a steering axis, the wheel carrier being coupled to the steering linkage so that actuation of the steering linkage pivots the wheel carrier about the steering axis; and
  (ii) a wheel rotatably coupled to the wheel carrier along a wheel axis, the wheel axis being oriented approximately perpendicular to the steering axis, wherein the wheel axis is offset from the steering axis.

13. The trailer of claim 12, wherein the longitudinal member has two ends at the front end and the rear end of the frame respectively, and the front cross-member and the rear cross-member are attached to the ends of the longitudinal frame member.

14. The trailer of claim 12, wherein the wheel axis of each of the front wheel assemblies is offset from the steering axis in a forward direction relative to the steering axis when the wheels are oriented along the longitudinal axis.

15. The trailer of claim 12, wherein the wheel axis of each of the rear wheel assemblies is offset from the steering axis in a backward direction relative to the steering axis when the wheels are oriented along the longitudinal axis.

* * * * *